UNITED STATES PATENT OFFICE.

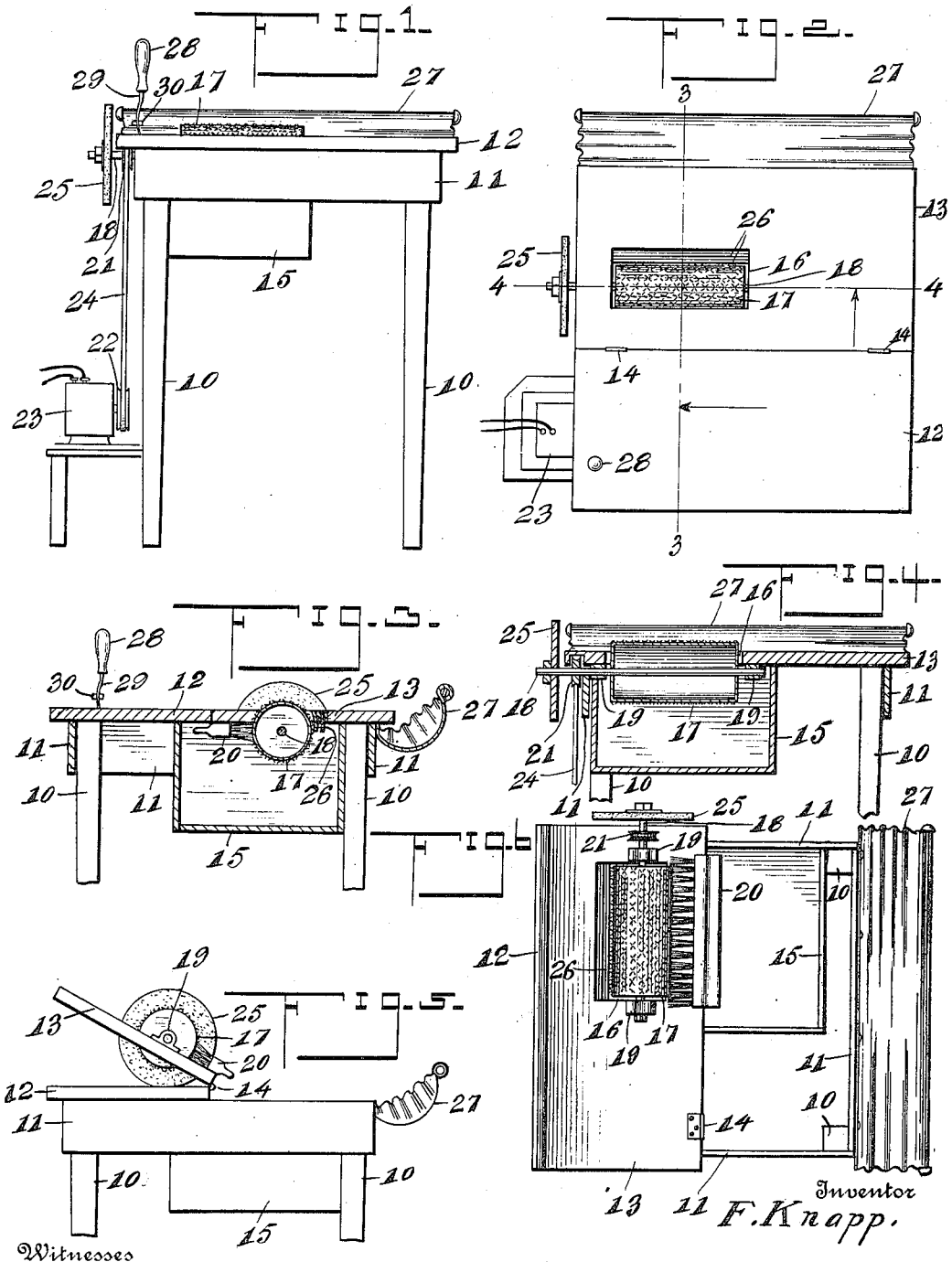

FRANK KNAPP, OF RIPON, WISCONSIN.

FISH-SCALER.

1,080,982. Specification of Letters Patent. Patented Dec. 9, 1913.

Application filed July 31, 1912. Serial No. 712,558.

*To all whom it may concern:*

Be it known that I, FRANK KNAPP, a citizen of the United States, residing at Ripon, in the county of Fond du Lac, State of Wisconsin, have invented certain new and useful Improvements in Fish-Scalers; and I do hereby declare the following to be a full, clear, and exact description of the invention, such as will enable others skilled in the art to which it appertains to make and use the same.

This invention relates to fish scalers and has for an object to provide a simple and compact device of this character which will have novel means for scaling a fish, and will be so constructed that this means may be readily exposed for cleaning.

With the above objects in view the invention consists of certain novel details of construction and combination of parts hereinafter fully described and claimed, it being understood that various modifications may be made in the minor details of construction within the scope of the appended claim.

In the accompanying drawing forming part of this specification:—Figure 1 is a front elevation of the device. Fig. 2 is a plan view of the device. Fig. 3 is a longitudinal sectional view taken on the line 3—3 Fig. 2. Fig. 4 is a cross sectional view taken on the line 4—4 Fig. 2. Fig. 5 is a side elevation of the device with the scaling means exposed for cleaning. Fig. 6 is a plan view of the parts shown in Fig. 5.

Referring now to the drawing in which like characters of reference designate similar parts, a table is shown comprising four legs 10 which are connected at their upper ends by cross bars 11 upon the top edges of which is supported a table top including a fixed leaf 12 and a hinged leaf 13 which is hinged at one edge to the fixed leaf by hinges 14. A substantially square box 15 is supported by the cross bars 11 and underlies the hinged leaf.

Formed in the hinged leaf is an oblong opening 16 which registers with the box 15 and revolubly mounted in this opening is a perforated cylinder 17 which is provided with a shaft 18 that is journaled in bearings 19 secured to the underneath face of the hinged leaf. This cylinder forms a grater or scaler against which the body of a fish may be manually held, and during rotation of the cylinder the scales are removed from the fish and carried through the oblong opening into the box 15. A flat brush 20 is fixed to the underneath face of the hinged leaf, the bristles of this brush bearing upon the cylinder and serving to brush the fish scales therefrom into the box.

A driving pulley 21 is fixed to the cylinder shaft, and over this driving pulley and the pulley 22 of any suitable source of power such as an electric motor 23, a belt 24 is trained. The scaling cylinder may thus be driven at a high rate of speed. An emery wheel 25 is fixed to the scaling cylinder shaft and may be utilized in sharpening knives for operating upon the fish.

A grating comprising spaced parallel bars 26 is secured in the oblong opening parallel with the cylinder and facilitates the escape of liquid into the scale box. To prevent fish scales from dropping on to the floor a substantially semicircular guard 27 is secured to the rear edge of the table and receives any scales which may escape over the rear edge of the table.

When it is desired to expose the under side of the scaling cylinder for cleaning, the hinged leaf 13 may be rocked open and laid back upon the fixed leaf as clearly shown in Figs. 5 and 6, in which position of the parts the scaling cylinder, brush and grating bars are all exposed as most clearly shown in Fig. 6.

For holding a fish against the scaling cylinder a fork 28 having two prongs 29 is provided, a cylindrical guard 30 being fixed to the prongs near their points to limit penetration of the prongs into the fish.

In operation the fish is held on the grating against the scaling cylinder which is rotated toward the grating whereby the scales are removed from the fish and escape through the grating into the box, the brush serving to clean the cylinder of whatever scales may have adhered to the latter. The grating forms means for securely anchoring the fish against slipping away from the cylinder during the scaling operation.

What is claimed, is:—

A fish scaler including a support having an opening therein, a fish supporting grating forming one side of said opening, a roughened cylinder in said opening having the longitudinal edges disposed in close proximity to said grating and to the opposite side of said opening from said grating, means for rotating said cylinder toward said grating, and a cleaning brush disposed on the underneath face of said support and bearing against said cylinder on the opposite side thereof from said grating.

In testimony whereof, I affix my signature, in presence of two witnesses.

FRANK KNAPP.

Witnesses:
 FRANK G. LUECK,
 JOS. L. STONE.